P. T. HEWEY.
KNOCKDOWN TOOL BOX.
APPLICATION FILED JUNE 7, 1919.

1,350,099.

Patented Aug. 17, 1920.
2 SHEETS—SHEET 1.

Inventor:
Pleg T. Hewey
by Jas. H. Churchill Atty.

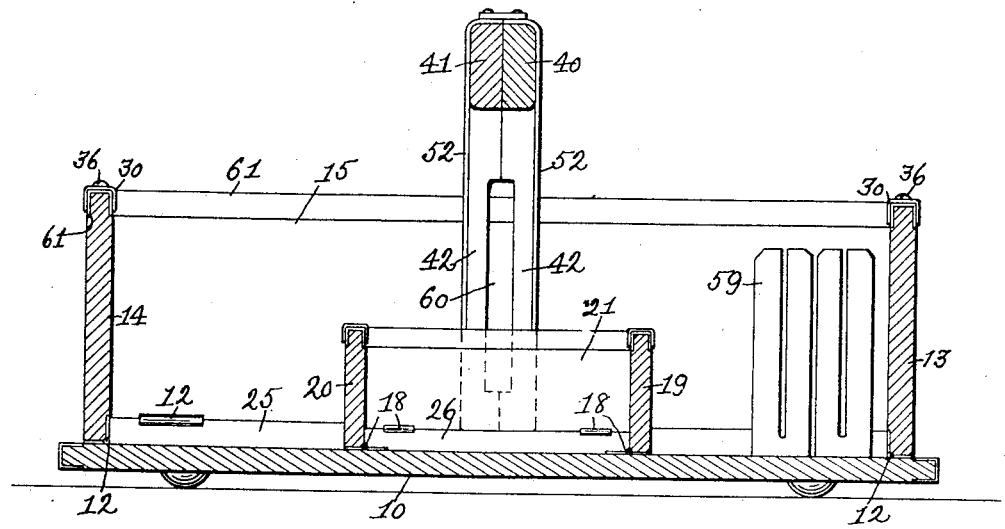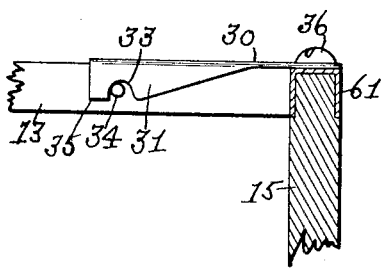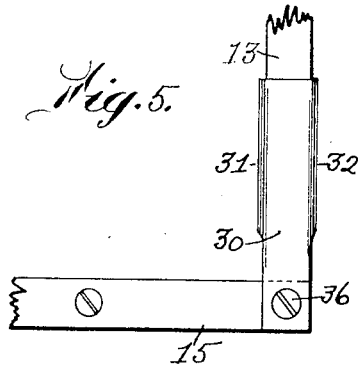

UNITED STATES PATENT OFFICE.

PELEG T. HEWEY, OF MALDEN, MASSACHUSETTS.

KNOCKDOWN TOOL-BOX.

1,350,099.  Specification of Letters Patent.  Patented Aug. 17, 1920.

Application filed June 7, 1919. Serial No. 302,510.

*To all whom it may concern:*

Be it known that I, PELEG T. HEWEY, a citizen of the United States, residing in Malden, in the county of Middlesex and State of Massachusetts, have invented an Improvement in Knockdown Tool-Boxes, of which the following description, in connection with the accompanying drawings, is a specification, like characters on the drawings representing like parts.

This invention relates to a knock-down tool box especially designed and adapted for use by carpenters.

The invention has for its object to provide a simple, inexpensive and efficient tool box, which is provided with a handle and with a plurality of compartments for holding tools of different sizes and which is capable of being knocked down into compact form capable of being inserted into the tool chest with which carpenters are usually provided.

The particular features of the invention will be pointed out in the claims at the end of this specification.

Figure 1:
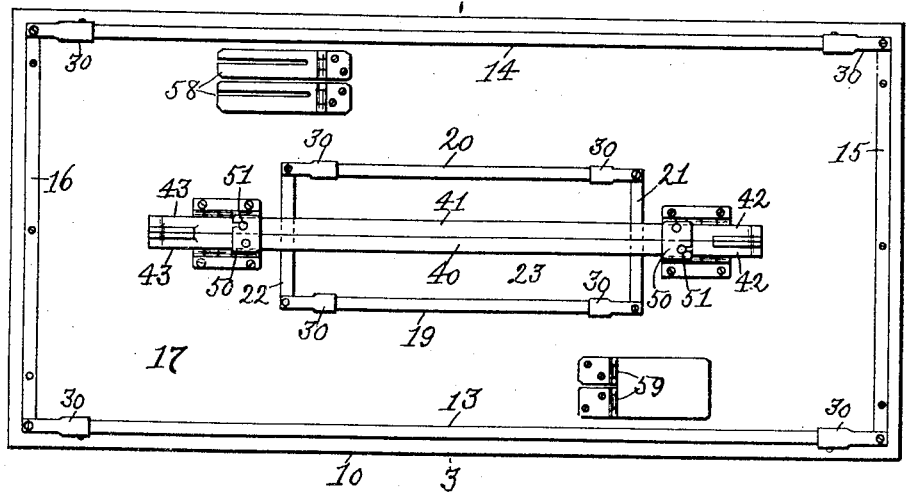

Figure 1 is a plan view of a tool box embodying this invention in condition for use.

Figure 2:
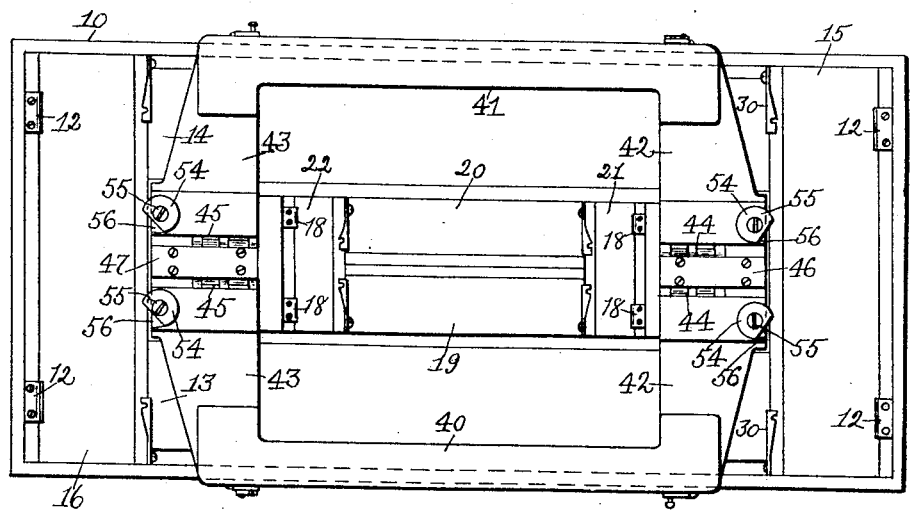

Fig. 2, a plan of the tool box in its knocked down condition.

Fig. 3, a cross section on an enlarged scale on the line 3—3, Fig. 1, looking toward the right, and Figs. 4 and 5, details to be referred to.

Referring to the drawings 10 represents the base or bottom member of the box, which has pivotally secured to it by hinges 12 or otherwise, the side walls 13, 14 and end walls 15, 16, of an outer compartment 17, and by hinges 18 the side walls 19, 20, and end walls 21, 22 of a smaller compartment 23, which is located substantially central with relation to the outer compartment 17.

The side walls 13, 14, 19, 20, are hinged so as to fold toward the longitudinal center of the bottom 10, and the end walls 15, 16, 21, 22 are hinged to fold toward the transverse center of the bottom 10.

The side walls 13, 14, of the outer compartment are hinged directly to the bottom 10 as are also the side walls 19, 20 of the inner compartment, while the end walls 15, 16, of the outer compartment are hinged to a strip 25 (see Fig. 3) attached to the bottom 10 and of a thickness substantially equal to the thickness of the side walls 13, 14, so that when the side walls are folded down parallel with the bottom 10 the end walls 15, 16, can fold over the side walls and lie flat upon the same.

The end walls 21, 22 of the inner compartment are hinged to a like strip 26 attached to the bottom 10 and of a thickness substantially equal to the thickness of the side walls 19, 20 of the inner compartment, so that the end walls 21, 22, can be folded over upon the side walls 19, 20, in their folded position and lie flat upon the same.

Provision is made for fastening together the side and end walls of the outer compartment when in their upright or operative position, and also for fastening together the side and end walls of the inner compartment, and in the present instance I have shown one construction of fastening device for effecting this result. Inasmuch as the fastening devices are of like construction, only one need be described in detail.

Referring to Figs 4 and 5, 30 represents the fastening device, which is preferably made of sheet metal and comprises a back plate or strip pivotally secured to an end wall as 15 and adapted to be extended over a side wall as 13, said plate or strip being made of a width substantially equal to the thickness of the side wall 13 and provided with flanges 31, 32, which extend over the opposite surfaces of the side wall 13 and are provided with notches 33 for the reception of the pins 34, said notches forming hooks or catches 35 which engage the pins 34 and thus lock the side and end walls of the compartment together.

The back plate or strip 30 of the fastening device extends beyond the flanges 31, 32, to impart a spring action to the fastener which allows the flanges to be disengaged from the pins and the side wall of the compartment, after which the fastening device can be turned on the screw 36, by which it is secured to the end wall 15, and brought over said end wall and engaged therewith when it is desired to fold the side and end walls down.

The box is also provided with a handle composed of two members 40, 41, each having end members 42, 43, which are pivotally secured by hinges 44, 45, to blocks 46, 47, secured to the bottom 10 of the box near its opposite ends and between the end walls of the inner and outer compartments 23, 17. The end members 42, 43 of the handle are hinged to the opposite sides of the blocks 46, 47, so that the handle members may be folded outwardly and into a substantially flat position substantially parallel with the bottom 10 as shown in Fig. 2.

Provision is made for locking the members 40, 41, of the handle members together when in their raised or operative position, shown in Figs. 1 and 3, and to this end, a catch 50 is pivoted to each handle member and engages a pin 51 carried by the other handle member, said catches being preferably located near the opposite ends of the longitudinal portion of the members 40, 41, and pivoted to extensions 52 of the straps or leaves of the hinges 44, 45, said straps or leaves being made long enough and having their ends bent to overlap the longitudinal portion of the handle members as represented in Fig. 3. The hinge extensions 52 act to reinforce the end members 42, 43 of the handle.

Provision is made for locking the end walls 15, 16, of the outer compartment in the folded-down position, which may be accomplished as herein shown by catches 54 rotatably secured by screws 55 in recesses 56 in the end members 42, 43, of the handle as shown in Fig. 2. The catches 54 are made as segments of circles and are designed to be turned so as to overlap the end walls 15, 16 of the outer compartment and thereby lock the said walls in their turned-down position.

The outer compartment 17 is designed to hold the larger tools employed by carpenters, such as hammers, saws and the like, and the smaller compartment 23 is designed to hold the smaller tools and keep them separated from the larger tools, thereby enabling a desired tool to be more quickly picked out of the tool box when wanted by the carpenter on the job.

The larger or outer compartment may and preferably will be provided with holders for some of the tools, and in the present instance the said compartment is shown as provided with hinged holders 58, 59, which are slotted to receive narrow tools such as saws. The slotted holders are capable of being turned up into a vertical position when the box is in its operative condition, (see Fig. 3) and to be turned down against the bottom wall 10 (see Fig. 1) when the box is to be knocked down.

When the tool box is in its knocked-down condition indicated in Fig. 2, the parts thereof are substantially parallel with the bottom 10 and occupy very little space, so that the knocked-down tool box may be inserted in the chest or large box with which carpenters are usually supplied and in which they convey their tools from one job to another. When the carpenter arrives at the job, the tool box is removed from the chest and assembled into its operative form shown in Figs. 1 and 3, and the carpenter then removes from the chest such tools as he needs for the particular work to be performed and places them in the compartments of the box.

The end members 42, 43, of the handle are preferably reduced in thickness at their lower ends, so that when the said members are assembled and locked together, they coöperate with the end walls 21, 22, of the inner compartment 23 to form slots 60, only one of which is shown in Fig. 3, and through which is extended one member of a carpenter's square or other tool.

The side and end walls of the compartments may be provided at their upper ends with sheet metal reinforcements 61.

I have herein shown one construction of tool box embodying the invention, but it is not desired to limit the invention to the particular construction shown.

Claims:

1. A tool box of the character described, comprising a bottom wall, side and end walls hinged thereto to be folded into a position substantially parallel with said bottom wall and to be folded into an upright position to form an outer compartment, means for locking said side and end walls in fixed relation in their upright position, a second set of side and end walls hinged within the outer compartment, means for locking the side and end walls of said second set in their upright position in fixed relation to form an inner compartment, a handle composed of members pivotally connected at their opposite ends to the said bottom wall between the end walls of said inner and outer compartments and foldable in opposite directions substantially parallel with said bottom wall, and means for securing said handle members in fixed relation in their upright position.

2. A tool box of the character described, comprising a bottom wall, side and end walls hinged thereto to be folded into a position substantially parallel with said bottom wall and to be folded into an upright position to form an outer compartment, means for locking said side and end walls in fixed relation in their upright position, a second set of side and end walls hinged within the outer compartment, means for locking the side and end walls of said seceond set in their upright position in fixed relation to form an inner compartment, and a handle pivotally connected with the bottom wall between the end walls of said compartments and foldable into a position substantially parallel with said bottom wall.

3. A tool box of the character described, comprising a bottom wall, side and end walls pivotally connected with said bottom wall to be folded into a position substantially parallel therewith and to be folded into an upright position, means for securing said walls in fixed relation in their upright position, and a handle having end members pivotally connected with said bottom wall to be folded from an upright position into one substantially parallel with said bottom wall.

4. A tool box of the character described, comprising a bottom wall, side and end walls pivotally connected with said bottom wall to be folded into a position substantially parallel therewith and to be folded into an upright position, means for securing said walls in fixed relation in their upright position, a handle having end members pivotally connected with said bottom wall to be folded from an upright position into one substantially parallel with said bottom wall, and means coöperating with said handle and end walls for locking the latter in their folded-down position.

5. A tool box of the character described, comprising a bottom wall, a handle having end members pivotally connected with the upper surface of said bottom wall between the ends of the latter to be folded down into a position substantially parallel therewith, and side and end walls pivotally connected with said bottom wall between the end members of said handle so as to be folded from an upright position into one substantially parallel with said bottom wall, and means for securing said side and end walls in fixed relation in their upright position to form a compartment which is located between the end members of said handle.

In testimony whereof I have signed my name to this specification.

P. T. HEWEY.